(12) United States Patent
Harrison et al.

(10) Patent No.: US 7,917,335 B2
(45) Date of Patent: Mar. 29, 2011

(54) METHOD AND SYSTEM OF MONITORING PROGNOSTICS

(75) Inventors: Gregory A. Harrison, Oviedo, FL (US); Alexey Turischev, Orlando, FL (US)

(73) Assignee: Lockheed Martin Corporation, Orlando, FL (US)

( * ) Notice: Subject to any disclaimer, the term of this patent is extended or adjusted under 35 U.S.C. 154(b) by 213 days.

(21) Appl. No.: 12/272,926

(22) Filed: Nov. 18, 2008

(65) Prior Publication Data

US 2009/0070282 A1    Mar. 12, 2009

Related U.S. Application Data

(60) Division of application No. 11/839,350, filed on Aug. 15, 2007, now Pat. No. 7,478,013, which is a continuation of application No. 11/235,440, filed on Sep. 26, 2005, now Pat. No. 7,277,823.

(51) Int. Cl.
*G06F 17/00* (2006.01)

(52) U.S. Cl. ..................................... 702/183

(58) Field of Classification Search .......... 702/182–185, 702/188
See application file for complete search history.

(56) References Cited

U.S. PATENT DOCUMENTS

| | | | |
|---|---|---|---|
| 5,159,660 A | 10/1992 | Lu et al. | |
| 5,375,250 A | 12/1994 | Van den Heuvel | |
| 5,774,586 A | 6/1998 | LeCun | |
| 6,175,787 B1 | 1/2001 | Breed | |
| 6,301,572 B1 | 10/2001 | Harrison | |
| 6,456,991 B1 | 9/2002 | Srinivasa et al. | |
| 6,493,689 B2 | 12/2002 | Kotoulas et al. | |
| 7,363,281 B2 | 4/2008 | Jin et al. | |
| 7,390,284 B2 | 6/2008 | Wheals | |
| 2002/0169583 A1 | 11/2002 | Gutta et al. | |
| 2003/0009270 A1 | 1/2003 | Breed | |
| 2005/0248136 A1 | 11/2005 | Breed et al. | |
| 2008/0147265 A1* | 6/2008 | Breed | 701/30 |
| 2009/0204237 A1* | 8/2009 | Sustaeta et al. | 700/36 |

OTHER PUBLICATIONS

Kaburlasos, Vassilis G., "Improved Fuzzy Lattice Neurocomputing (FLN) for Semantic Neural Computing," International Joint Conference on Neural Networks (IJCNN 2003), Portland, Oregon, Jul. 20-24, 2003, vol. 3, pp. 1850-1855.
Non-Final Rejection mailed Aug. 22, 2006, for U.S. Appl. No. 11/235,440.
Final Rejection mailed Feb. 20, 2007, for U.S. Appl. No. 11/235,440.
Notice of Allowance mailed Jun. 12, 2007, for U.S. Appl. No. 11/235,440.
Non-Final Rejection mailed Jun. 11, 2008, for U.S. Appl. No. 11/551,024.
Final Rejection mailed Dec. 11, 2008, for U.S. Appl. No. 11/551,024.
Restriction Requirement mailed May 12, 2009, for U.S. Appl. No. 11/551,024.
Non-Final Rejection mailed Sep. 15, 2009, for U.S. Appl. No. 11/551,024.
Final Rejection mailed May 11, 2010, for U.S. Appl. No. 11/551,024.
Advisory Action mailed Aug. 18, 2010, for U.S. Appl. No. 11/551,024.

(Continued)

*Primary Examiner* — Edward Raymond
(74) *Attorney, Agent, or Firm* — Withrow & Terranova, PLLC (57) ABSTRACT

A neural network learns the operating modes of a system being monitored under normal operating conditions. Anomalies can be automatically detected and learned. A control command can be issued or an alert can be issued in response thereto.

24 Claims, 5 Drawing Sheets

OTHER PUBLICATIONS

Restriction Requirement mailed Jul. 10, 2008, for U.S. Appl. No. 11/839,350.

Notice of Allowance and Examiner's Amendment mailed Sep. 9, 2008, for U.S. Appl. No. 11/839,350.

* cited by examiner

METHOD AND SYSTEM OF MONITORING PROGNOSTICS

CROSS-REFERENCE TO RELATED APPLICATIONS

This application is a Divisional of U.S. patent application Ser. No. 11/839,350 filed Aug. 15, 2007 which is a Continuation, and claims the benefit of, U.S. patent application Ser. No. 11/235,440 filed Sep. 26, 2005. The entirety of this application is incorporated by reference as if fully set forth herein.

FIELD OF THE INVENTION

The invention pertains to detection of anomalies in complex circumstances and systems. More particularly, the invention pertains to the automatic detection of such anomalies while a system is being monitored.

BACKGROUND OF THE INVENTION

Neural network based analysis systems for detecting and analyzing vibration are known. One such system and method are disclosed in U.S. Pat. No. 6,301,572 B1 entitled "Neural Network Based Analysis Systems for Vibrational Analysis and Condition Monitoring" which was filed Oct. 9, 2001 and is assigned to the assignee hereof. The disclosure of the '572 patent is hereby incorporated herein by reference.

In the system and method of the '572 patent, time domain outputs from a vibration sensor coupled to an apparatus being monitored are transferred to the frequency domain. Frequency domain outputs can then be provided as inputs to a fuzzy adaptive resonance-type neural network. Outputs from the network can be coupled to an expert system for analysis, to display devices for presentation to an operator or for use for other control and information purposes.

While the system and method of the '572 patent are useful and effective for their intended purpose, that solution was directed primarily to addressing vibration signals. There is a need for and it would be desirable to be able to automatically detect anomalies in complex systems which are continually being monitored for any deviation from normal operating condition. It would be desirable if the monitoring system could automatically learn the characteristics of the anomalous condition and respond thereto by generating a control command or causing a selected indication to be produced.

DETAILED DESCRIPTION OF THE EMBODIMENTS

While embodiments of this invention can take many different forms, specific embodiments thereof are shown in the drawings and will be described herein in detail with the understanding that the present disclosure is to be considered as an exemplification of the principles of the invention and is not intended to limit the invention to the specific embodiment illustrated.

In a system which embodies the invention, behaviors of various parameters which characterize an apparatus being monitored can be learned. Parameters include, an electrical state vector, the states of digital inputs and outputs, and operating modes of the apparatus. The system can then detect changes or variations from the learned behavior of those parameters.

The detected changes or variations can be learned. They can trigger responses such as control command, alerts, recording of apparatus behavior or the like all without limitation.

In one aspect of the invention, a system employs at least one neural network to learn the time-and mode-based characteristics of an external apparatus. Many interfaces are capable of being monitored, and actions may be taken through various outputs. The neural network learns the normal operation of the monitored apparatus. It can detect anomalies, or be used as a control system for the monitored apparatus. The system can serve as an embedded intelligence, with learning and acting capabilities, that can be applied in many situations.

In another aspect of the invention, as the monitored apparatus is operated and changes modes, a neural network memory can be modified to record the traces of the system state as evidenced by the internal representation of an input signal. As the monitored apparatus is operated more and more, the traces in neural network memory get modified to form a general path through the recorded state space of the monitored apparatus. If the apparatus should deviate from ordinary operations then the deviation can be immediately detected.

A neural network of a type disclosed, in U.S. Pat. No. 6,301,572 can be used to record the plurality of inputs presented to the network, during a learning phase. It can also be used to detect outlier input states during operation to produce an alert.

The outlier inputs can represent an anomaly. At the least they represent a set of input states that have not been previously recorded. The anomaly path through state space/neural memory can be recorded in a neural net memory for later analysis, or to become part of the accepted state space path.

The set of input states can enter the neural network through a neural dimension mapper that ensures that the inputs are correctly represented in a selected range in a neural interface vector. The neural dimension mapper can repeatedly create machine-learnable vectors of inputs that are passed to the neural network through a neural interface.

In another aspect of the invention, the sensory input data can be obtained from a system that gathers the electrical sensor data and standardizes it to numerical ranges appropriate for the neural net. A hardware interface can be used to bring many different types of sensor input information to the neural net.

In yet another aspect of the invention, a plurality of sensors can be coupled to a plurality of neural networks. The neural networks can each receive a common set of inputs. In accordance herewith, the sensors and neural networks combinations can be displaced from one another in wireless communication with, in one disclosed embodiment, a common control unit.

In accordance with another disclosed embodiment, different sensors can provide inputs to different networks. A common device can be monitored or controlled by such a sensor/network combination.

Figure 1:
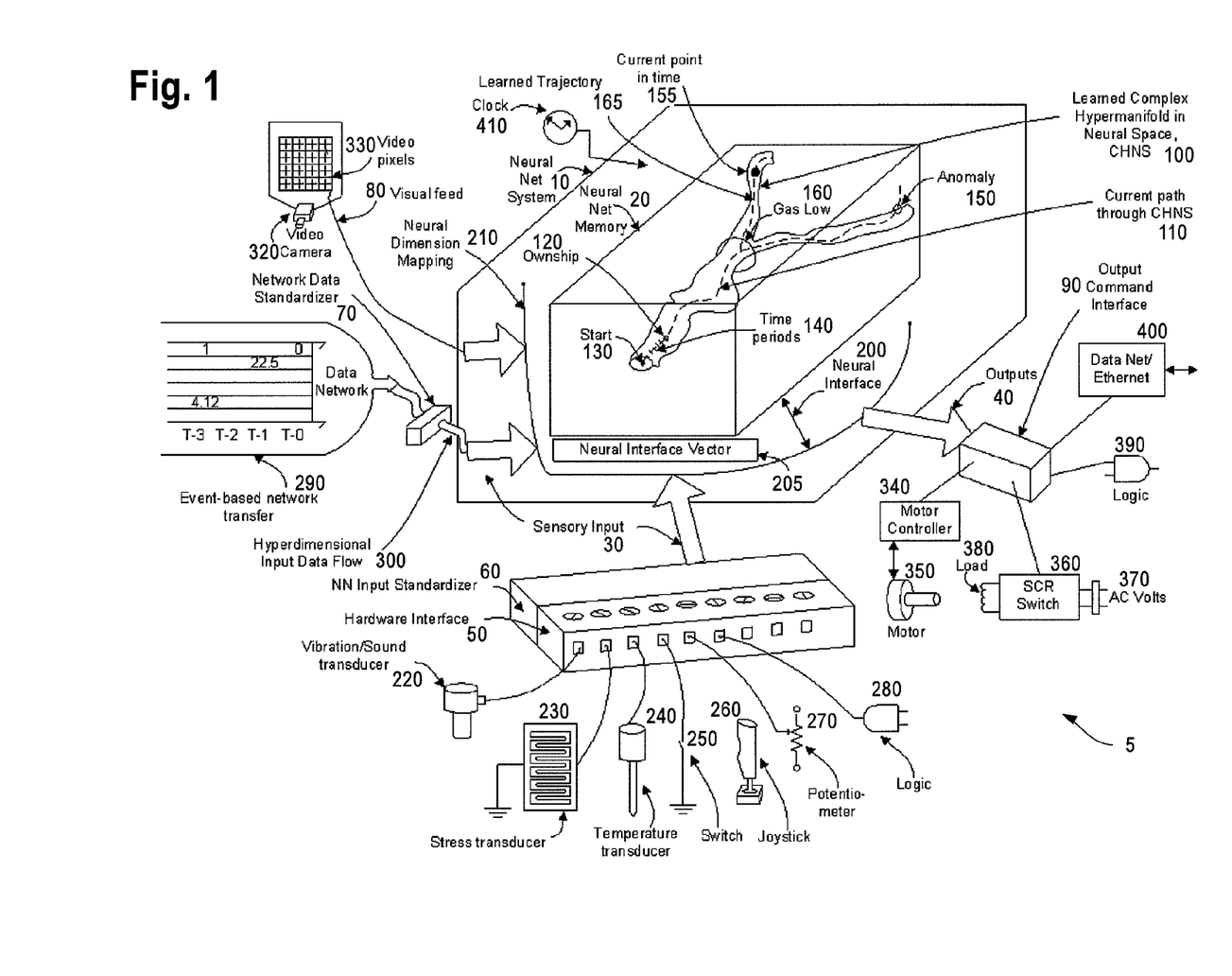
FIG. 1 is a block diagram of a system in accordance with the invention.

With reference to FIG. 1, a device 5 in accordance with the invention, includes a neural net system 10 with an included memory 20. A plurality of inputs 30 to system 10 contribute to production of a plurality of outputs 40.

Representations 30 of physically sensed inputs are coupled from an input hardware interface 50 and attached neural net input standardizer, or normalizer circuitry 60 to a neural interface vector, buffer 205. Input signals to interface 50 can reflect a variety of real-world conditions as presented to system 5 by various transducers.

After all the inputs have been signal-conditioned in the hardware interface 50, the input standardizer circuitry 60 transforms the inputs to best highlight their information-yielding capability to the neural network 10. The data is passed through to neural dimension mapper circuitry prior to inclusion in neural interface vector 205.

Representative transducers, without limitation, include vibration and/or sound transducers, illustrated by transducer 220, stress transducer 230, thermal or temperature transducer 240, switches 250, joystick 260, potentiometers 270 as well as processed signals from other circuits or systems 280. It will be understood that the above identified inputs are illustrative only and are not limitations of the invention. Other inputs such as velocity, infrared or RF emissions all come with the spirit and scope of the invention.

An upstream network 290 can be coupled via data standardizer circuiting 70 to system 10. The system 290 could include a multi-computer network such as the Internet.

Two dimensional visual inputs 80 can also be coupled to system 10. Inputs 80 can be received from digital cameras 320 in the form of a two dimensional array of pixels 330.

The outputs 40 can be coupled via an output command interface 90, to one or more output ports. Representative output ports include a motor controller 340, which drives electrical or hydraulic motor 350, an electrical switch, or array of same 360 to coupled electrical energy from a source 370 to a load 380. Other representative outputs include digital circuitry 390 and a downstream network 400. The network 400 could include one or more computer networks such as the Internet.

Remote data and states of the system being monitored may be received over a data network. For minimum redundancy in the network communication messages, only changes could be sent on the physical network identified as event-based network transfer 290. The neural network 10 takes advantage of a full multidimensional vector of inputs for training and operation. The state of the input is preferably retained in memory 20 locally in-between events.

For instance, if the network 10 receives a value of 10.5. as the level for a given input it will change its local representation of that input to 10.5 and leave it unchanged until it receives new information over the network interface concerning that input. Thus the data can be time-multiplexed on the data network cable, and only changes need be sent across to the network to minimize bandwidth.

A memory usable to store and/or to represent each potential input can be maintained in a network data standardizer 70. The network data standardizer 70 can also adjust the ranges and formats of the incoming data to be appropriate for the neural network input. The standardized full-set of data can be transferred to the neural network 10 through a hyperdimensional input data flow port 300.

In accordance herewith, the sensors, network data, and outputs are all mapped into a neural interface vector 205 of the neural net memory 20. Also, time information is available for control of the neural network 10 from an external clock 410 that can be synchronized with the other clocks on the network. Network synchronization is preferable in order to incorporate time-coherent information in the neural interface vector 205.

As multiple epochs of learning occur, the path through neural state space is widened out to encompass small variations that may occur in repeat performances of the system operation scenario. Thus an envelope or manifold of points describe tunnels through neural memory state space, referred to as a Complex Hypermanifold in neural space 100.

FIG. 1 illustrates an exemplary three dimensional, plus time, representation of an Ownship vehicle 120 traversing a path in three-dimensional space 110 that had been automatically learned by previous excursions through this path. As long as the vehicle stays within the path tunnel, no warnings are given.

If an anomaly 150 occurs, such as the vehicle leaving the path, then this state is detected by the neural network 10, and the information used as a basis for whatever measures would be taken. Forking of the path may occur for many reasons. In an exemplary embodiment, it is represented as two ways to resolve a Gas Low state 160. The state may be resolved by outputs directed to either landing for fuel or carrying out an in-air refueling.

Time may also be a dimension in the system 10. New system learning can take place during given time periods 140. Differences in temporal performance of the Ownship 120 on a path through state-space would be detectable.

In a student pilot training application, a start point 130 could be at the start of the takeoff acceleration, with new comparisons at various time periods 140 throughout the flight. The system 10 and associated process could also be used for mission simulation to ensure that the mission scenario training follows the desired progression.

Figure 2:
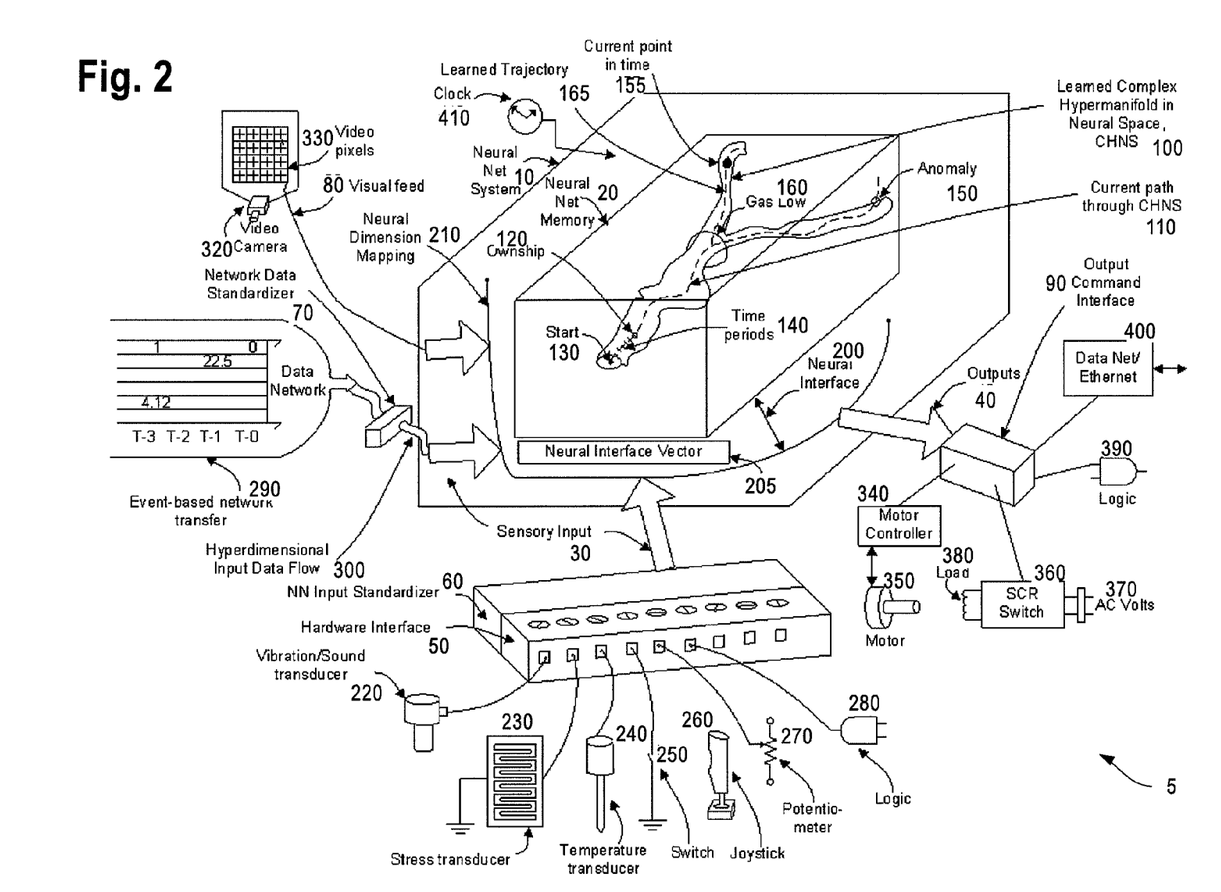
FIG. 2 is a block diagram of a particular embodiment of a system as in FIG. 1.

Those skilled in the art will understand that the network 10 and associated circuitry could be incorporated into, or used in connection with a variety of apparatus. For example, and without limitation, it could be used to monitor/control starting an automobile to help discern engine problems. It could be used for control system applications, by causing outputs when certain states, such as anomaly states, are reached FIG. 2 illustrates an application of the system 5. In FIG. 2 the same identification numerals are used for common elements as in FIG. 1. The system 5 employs the neural network 10 to learn characteristics of an external system and later uses this knowledge to alter the controls of an object, or, a vehicle, for example, in anticipation of change.

The data is fed into Neural Net System 10, through various inputs such as sensors 30 and network 300. The system 5 then compares a current input 155 with learned Complex Hypermanifolds of data in Neural Space (CHNS) 100, which reside in neural memory 20. The system thus tracks an instance of an object as it moves the neural space at certain time intervals 140.

If an object is following a learned path within CHNS 165, than the system is able look ahead along this trajectory to anticipate changes that are coming. For example, if an object is currently at point in time such as one indicated by 155, then the system can look ahead to determine that a change is likely and what kind of change, for instance a sharp turn to the right.

This application can be implemented in a variety of fields. One example would be a coffee machine turns on a couple of minutes before a person's alarm activates in the morning, followed in 15-20 minutes by starting of the car and, in a little more time, by opening of a garage door. Another example would be when tests are performed on gas turbines, such as the ones installed on power plants, the system would be able to predict the behavior and automatically speed up or slow down as necessary. To summarize, this application is useful in any situation where a similar set or multiple sets of instructions need to be executed every time.

Figure 3:
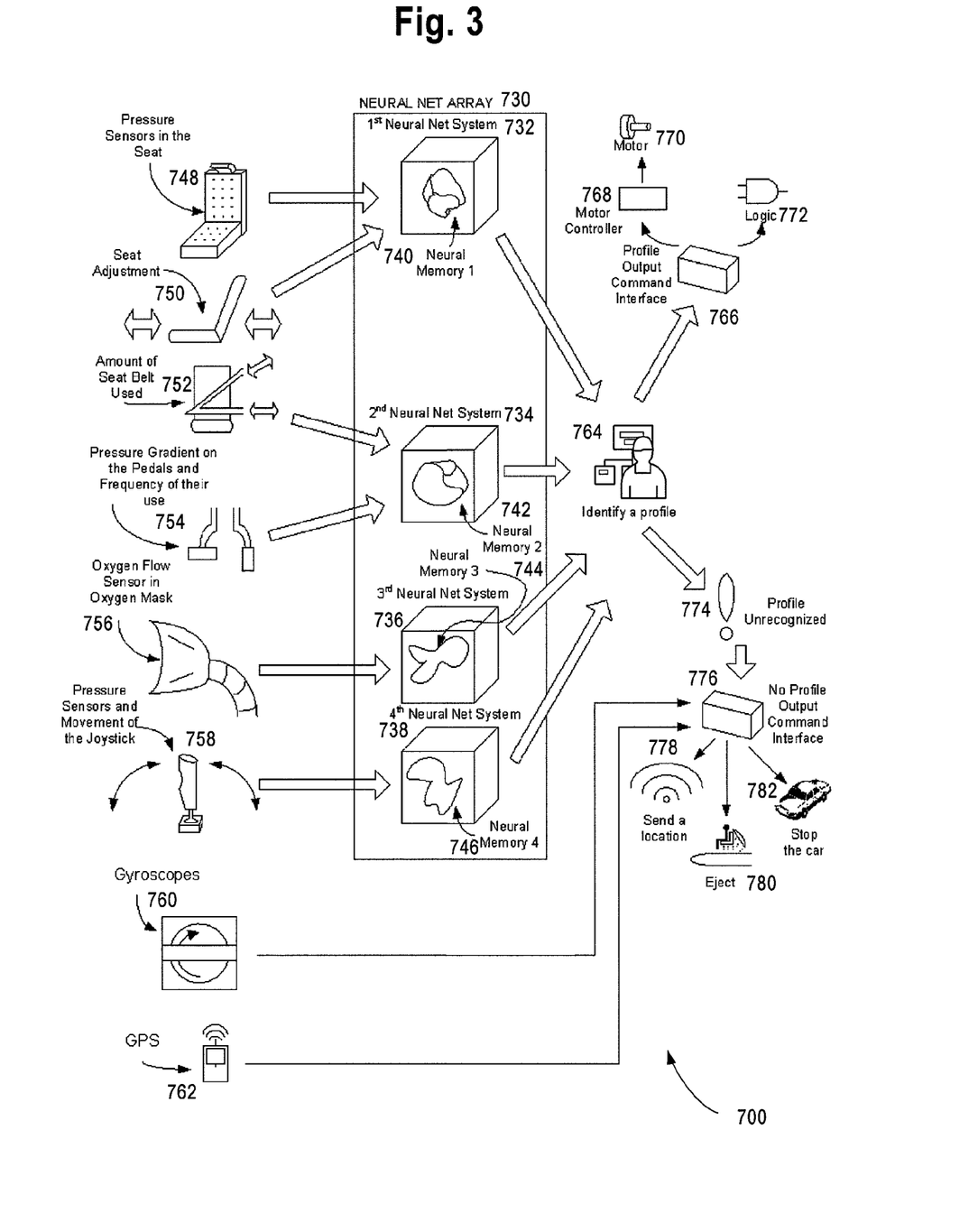
FIG. 3 is a block diagram of an embodiment of the invention which incorporates a plurality of neural networks.

FIG. 3 illustrates a profile identification and control application system 700 that incorporates a plurality of neural net systems, such as system 10. The system 700 employs an array of complex behavior monitoring methods to first learn the normal operation of the system and later detect any deviations from it. The normal operation of the system is learned by monitoring it over a period of time in a learning mode. When in a detection mode, however, anything that does not fall into learned space, will trigger an alert and further steps can be taken as necessary.

A set of fuzzy adaptive resonance theory (ART) neural networks 732-738 are organized in an array 730 and employed to record the inputs. The inputs are coming from various sensors and gauges installed in control and monitoring equipment of the system. Therefore, the inputs vary with the system.

For example, the inputs where the vehicle is a car will be different from inputs where the vehicle is a plane or a ship. Inputs for a car can include weight distribution from sensor array built in the seat 748, seat adjustments 750, amount of seat belt used 752, pressure gradient on the pedals and frequency of their use 754.

In an aircraft, inputs can include weight distribution from the sensor array built in the seat 748, pressure gradient on the pedals and frequency of their use 754. Other aircraft inputs can include oxygen flow 756, movements and pressure on the joystick 758.

Each Neural Net System in an Array 730 can have one or more inputs. For example, weight distribution and seat adjustment can be inputs to the $1^{st}$ System 732. Seat belt and pedals usage can be inputs to the $2^{nd}$ System 734. Oxygen flow and joystick movements can be inputs to $3^{th}$ 736 and $4^{th}$ Systems 738, respectively.

Each value from a sensor represents a dimension. For example, if there are 24 pressure sensors in the seat to produce a weight distribution, than they are represented as 24 dimensions in the Neural System 732. Thus, each system in the Array 730 has a different number of dimensions and, hence, may not be interchangeable.

When the Neural Net Systems in an Array are in the learning mode, each new value that has not been registered before is recorded in Neural Memory 740-746. For the reasons mentioned above, each neural system has its own memory and its own set of learned values. A combination of these distinct learned values sets in an Array 730 constitutes a profile 764.

When the system 700 is switched into the detection mode, and all values match those stored in a profile, then the user or situation has been successfully authenticated. In this circumstance, an Output Command Interface 766 receives changes it needs to make for a current user, such as adjusting seat position and mirrors using Motor Controllers 768, Motors 770, Logic 772 and other equipment.

However, if a value in any Neural Net System falls outside of learned memory space, it triggers an alert. If this alert comes from a critical system or if the Array 730 receives alerts from several Neural Net Systems in a short span of time, it may no longer be able to identify a profile 774. In this circumstance, a signal is then coupled to Output Command Interface 776. Output command interface 776 has additional inputs such as from Gyroscopes 760 and GPS 762. Using them and alert data it can more accurately estimate what might be happening to a vehicle or a device that is being monitored, and appropriately respond to it. The response would depend on the type of vehicle and on specific situation.

For example, if a weight distribution 748 and foot pedals usage 754 in a car do not match any profile, the control could ask for a validation key, and, if not provided any, shut down the engine 782 and send out a signal with its location 778.

Another example relates to aircraft, for example a jet. If a pilot is not breathing (there is no oxygen flow) 756 and gyroscopes 760 show a high angular velocity, while movements of control stick 758 are erratic, chances are that the pilot has lost consciousness. To confirm, a prompt can be sent to the pilot to push a button and, if it is not pushed, send location information 778 and then eject 780.

This application can provide both added usability as well as better safety and security. For example, in some embodiments, one would not even need a key to start a car. However, that same car would not go far if somebody tried to steal it. The same idea of profile matching using an array of neural networks can be applied to many different situations from wheel chairs to automatic computer logins by recognizing a person sitting down.

Figure 4:
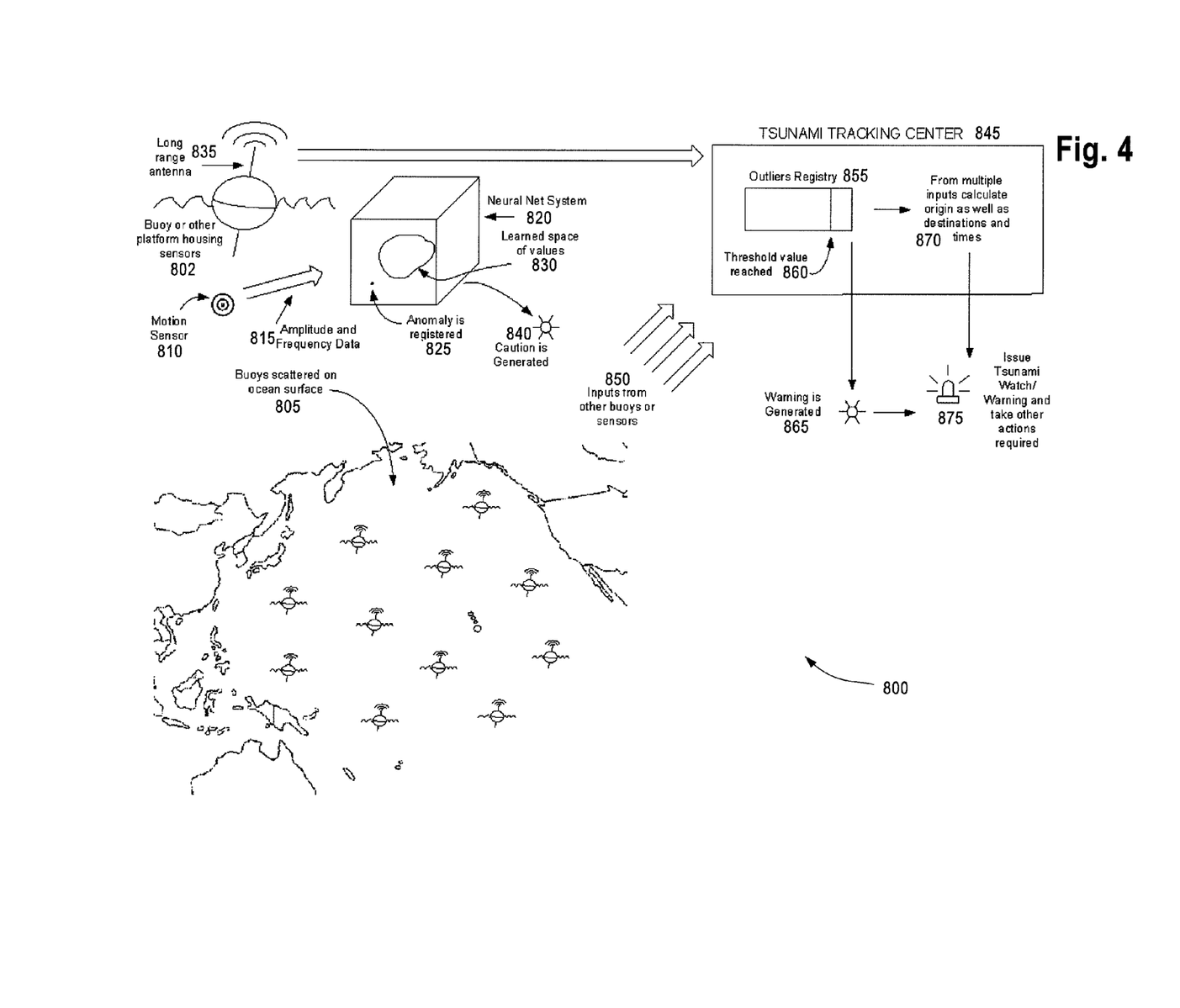
FIG. 4 is a block diagram of a different embodiment of the invention which incorporates a plurality of neural networking.

FIG. 4 illustrates a tsunami detection and warning system 800 that incorporates a plurality of independently operating neural net systems, such as the exemplary system 20. The system 800 employs an array of neural networks to learn normal behavior of the ocean and later detect any anomalies such as tsunamis, freak waves, typhoons, etc. The neural system 800 learns the normal behavior of the ocean by monitoring it over a period of time. When the system 800 is switched into a detection mode, it will identify and communicate instances that fall outside of learned values for normal behavior.

A plurality of fuzzy adaptive resonance theory neural network such as network 820, is employed to record inputs associated with description of the behavior of the ocean. These inputs can include amplitude of the waves, frequency of the waves, as well as any other variables as would be understood by those of skill in the art.

The neural network 820, all sensors such as sensor 810, communication equipment, an energy source, as well as any other equipment necessary will preferably be housed in a buoy or other similar platform 802. The buoys are not expected to require maintenance and will be able to sustain operation for several years. Multiple buoys 802 will be scattered throughout the ocean 805, thereby creating a well spaced grid. Those of skill in the art will understand how to determine drop off locations for the buoys 802, as they will not be self-propelled and will drift in ocean currents.

Inside the buoy 802, there will also be a motion sensor 810 capable of detecting physical movements of the buoy, especially along vertical coordinate. Frequency will be derived from change in Amplitude over a short period of time. For example, frequency is inversely proportional to the time it takes to travel the distance between two crests. Amplitude, Frequency, as well as any other variables will then be sent to the local Neural Network (NN) System 820.

Each variable represents a dimension. Thus, each data point corresponds to a multidimensional point. Consequently, system 820 represents a multidimensional space. In a learning mode, the system will record each multidimensional point it has not encountered before. After some time in operation in this mode, a Learned Space of Values 830 is created.

When the system 820 is switched into a detection mode, each value, which has not been encountered by the system before, will be considered an anomaly 825 and will generate a caution or an indicator 840. At this time a message consisting of each recorded variable as well as buoys current geographical position can be sent to a Tsunami Tracking Center 845 using low frequency antenna 835 or some other means of communication.

The Tsunami Tracking Center 845 will record messages from all buoys 802 in that area of the ocean 850 in an Outliers Registry 855. If this registry receives several outliers in a short period of time, a threshold value will be reached 860.

Once the threshold value has been reached, it will create an alert 865, notifying personnel at the tracking center. At the same time, all of the variables received from different buoys that triggered an alert will be passed to a computer or other pieces of equipment that would be able to analyze them, generate preliminary analysis of situation, and predict times of arrival to different locations 870, if it is, indeed, a tsunami. Staff at the Tsunami Tracking Center 845 will then be able to issue timely watches and warnings to areas affected as well as to take any other necessary actions 875.

A similar system with modifications can be adapted to a multitude of different uses including tracking earthquakes and nuclear tests.

Figure 5:
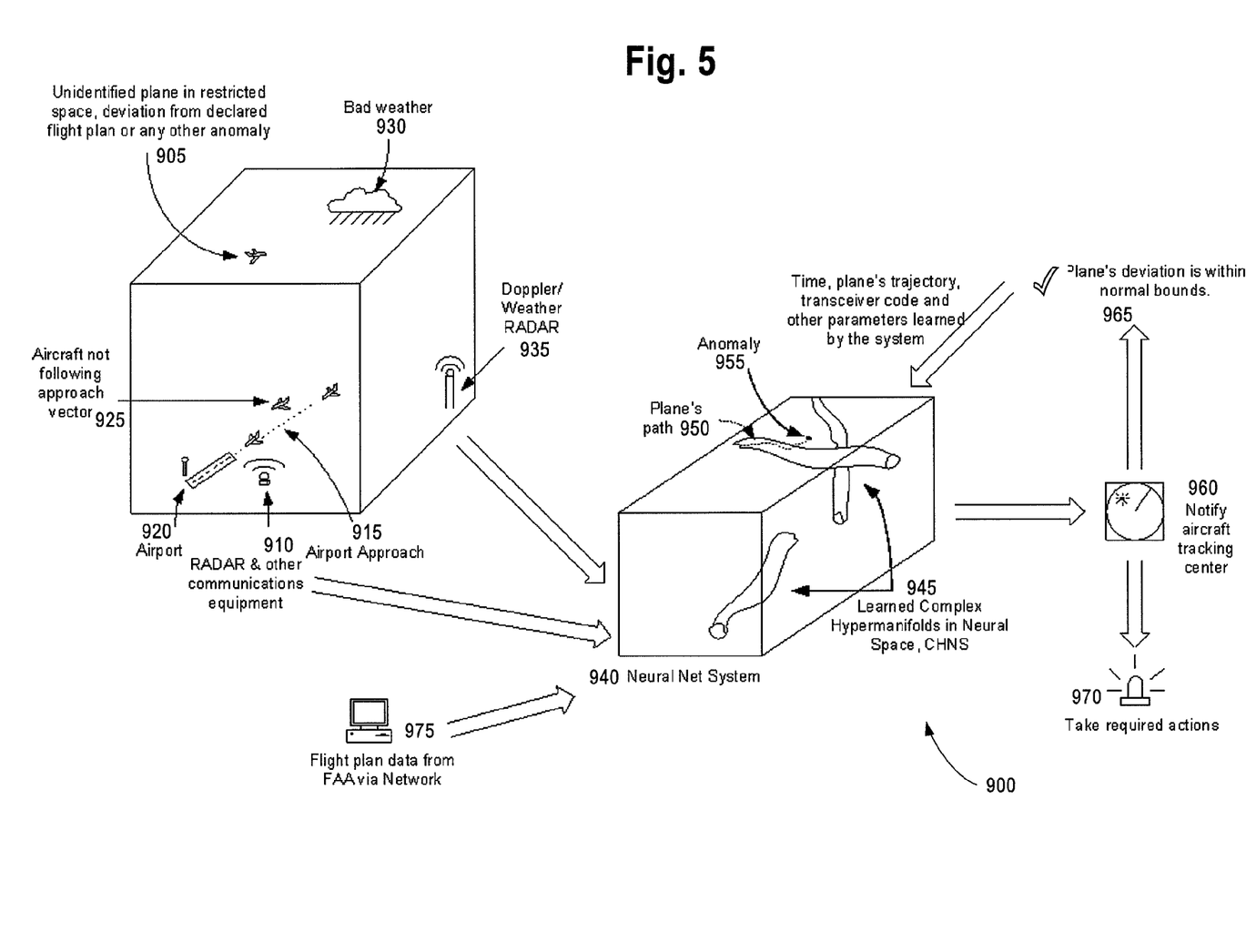
FIG. 5 is a block diagram of another embodiment in accordance with the invention.

FIG. 5 illustrates an unidentified aircraft and flight plan deviation warning system 900. The system 900 incorporates a neural network system 940, corresponding to exemplary system 20 to learn normal trajectories of aircraft as well as radar signatures and transceiver codes associated with those trajectories in a particular area. The neural system 900 learns the usual air traffic by monitoring it over a period of time. When the system 900 is switched into a detection mode, it will detect unidentified and stray aircraft and immediately perform all the necessary actions.

The fuzzy adaptive resonance theory (ART) neural network 940 is employed to record inputs associated with identifying and tracking an aircraft.

These inputs include aircraft identification code, speed, altitude, trajectory, radar signature, as well as FAA filed flight plan, current weather in the area. Other inputs, as those of skill in the art will understand could also be monitored.

In order to detect any deviations, neural network system 940 first must learn usual or normal flight patterns. It is capable of doing so in two ways: by receiving flight plans data over the network from FAA 975 for jets and other large planes and by observing usual or normal air traffic for planes with undeclared flight plans using visual flight rules (VFR).

The system 900 uses radar and other equipment 910 to identify and track a plane. Each point of the plane's path 950 is stored by its geographical position, altitude, and aircraft's speed, ID, radar signature, as well as other variables. Each of these variables represents a dimension. Each data point in the neural net system 940 thus corresponds to a multidimensional point. Consequently, the system 940 represents a multidimensional space.

In a learning mode, the system 940 records each multidimensional point it has not encountered before. After some time in operation in this mode, multiple specialized Complex Hypermanifolds in Neural Space CHNS are created 945.

When system 940 is switched into the detection mode, each multidimensional point outside of learned CHNS will be considered an anomaly 955. When such an anomaly occurs, staff at an aircraft tracking center can be notified and other steps can be automatically taken. Staff can then monitor the progress of the plane and issue further warnings 970 or consider the plane within normal bounds 965, in which case plane's trajectory and characteristics can be added to the learned characteristics of neural network system 940.

The system 900 can be used for monitoring aircraft progress in connection with landing approaches 915. Alternately, it could be used to identify potentially dangerous aircraft 905. When an aircraft is not following an approach vector 925, it could mean serious trouble for people both in the air as well as on the ground. If this happens just a short distance from an airport 920, then there's very little time to react. The system 900 could be used to sound an alarm at an airport fire department.

In another scenario, a known aircraft might deviate from its declared flight plan 905. In this case, Doppler/Weather Radar data 935 can be used to determine if there's any bad weather in the area 930 to try to explain flight path deviation. If the aircraft just flies around bad weather, then a warning is never issued or is silenced but the path is not added to CHNS 945. On the other hand, if the weather is good and aircraft still deviates, then the warning can be issued immediately.

Alternately, when an unidentified aircraft with no flight plan and small radar signature 905 enters the airspace, there is no trouble as long as it stays within learned CHNS. However, if it has a significant radar signature and/or it goes outside of CHNS a warning can be immediately issued.

Similar concepts can be adapted to alternative uses including tracking vehicles, items, or shipments, monitoring and/or controlling equipment, or systems, monitoring area-wide events including nuclear events, solar events, oceanic events, atmospheric events, or geological events all without limitation.

While the above described neural networks could be implemented in accordance with the teachings of the '572 patent, those of skill will understand that other neural network implementations could also be used without departing from the spirit and scope of the invention. Further, from the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A method comprising:
sensing periodic time based indicia;
sensing a plurality of sets of conditions associated with operation of a selected system at spaced apart timed intervals;
generating representations of the sensed conditions;
processing the representations along with at least some of the time based indicia, with at least one neural network with the network exhibiting a plurality of learned states with each state corresponding to a respective set of sensed conditions; and
combining results of the processing, and responsive to the combining,
producing at least one of an alarm indicator, or, a control signal,
where processing includes comparing time evolution of sensed conditions with learned time evolution of operation of the selected system.

2. A method as in claim 1 where the sensed state of the sensors at respective intervals changes over time to create a trajectory of system states through time that is learned by the neural network.

3. A method as in claim 2 where the trajectory of states through time adapts in response to repeated training with new time-based training data to learn a system state trajectory that comprises a path that describes an average state trajectory within selected ranges, thereby creating a footprint in the memory of the system state trajectory through time.

4. A method as in claim 3 which includes, a learned state trajectory path able to monitor a state trajectory of a system in operation, and providing an indication of deviation from the previously learned trajectory path.

5. A method as in claim 4 which includes detecting and monitoring anomalies, reporting the anomalies to a user, and causing control actions to take place.

6. A method as in claim 5 which includes displaying the current set of system state parameters and their expected ranges as time progresses.

7. A method as in claim 6 which includes learning trajectories of aircraft in various flight patterns and indicating deviances from the expected flight plan.

8. A method as in claim 6 that includes learning expected time-based behavior of a plurality of ocean states at distributed locations and detecting anomalies in ocean rhythms that may be indicative of tsunami conditions or other unexpected ocean conditions.

9. A method comprising:
providing a learning mode to train at least one neural network in the expected,
normal, operation of a movable vehicle;
sensing a plurality of vehicle inputs, the values of which are indicative of normal operation of the vehicle, and responsive thereto establishing an expected, normal operational profile of the vehicle in the at least one neural network;
providing a detection mode for the at least one neural network; and
sensing the plurality of vehicle inputs, the values of which are indicative of real-time vehicle operation and, responsive thereto, determining, using the at least one neural network and the previously established normal operational profile, if the present values are indicative of normal operation of the vehicle.

10. A method as in claim 9 which includes generating an anomaly indicator where the present values are not indicative of normal operation of the vehicle.

11. A method as in claim 10 which includes providing periodic time based indicia.

12. A method as in claim 11 which includes combining periodic time based indicia with vehicle inputs in the learning mode.

13. A method as in claim 12 which includes basing the normal operational profile, at least in part, on the combined periodic time based indicia.

14. A method as in claim 13 which includes training a plurality of neural networks in the expected, normal, operation of a movable vehicle.

15. A method as in claim 14 which includes allocating members of the plurality of vehicle inputs to different members of the plurality of neural networks.

16. A method as in claim 15 which includes generating at least one vehicle control signal in response to having generated the anomaly indicator.

17. A method as in claim 9 which includes generating at least one vehicle control signal in response to determining that the present values are indicative of normal operation of the vehicle.

18. A method as in claim 17 which includes providing periodic time based indicia and combining periodic time based indicia with vehicle inputs in the learning mode.

19. A method comprising:
providing a learning mode to train at least one neural network in the expected,
normal, behavior of a selected entity;
sensing a plurality of time varying inputs associated with the expected behavior of the entity, and responsive thereto establishing an expected, normal behavior profile of the entity in the at least one neural network;
providing a sequential plurality of time based indicia;
providing a detection mode for the at least one neural network; and
sensing the plurality of time varying inputs, the values of which are indicative of real-time behavior of the entity, and the time based indicia, and, responsive thereto, determining, using the at least one neural network and the previously established normal behavior profile, if the present values are indicative of expected, normal behavior of the entity.

20. A method as in claim 19 which includes generating an anomaly indicator where the present values are not indicative of normal behavior of the entity.

21. A method as in claim 19 which includes combining periodic time based indicia with entity inputs in the learning mode.

22. A method as in claim 21 which includes basing the normal behavior profile, at least in part, on the combined periodic time based indicia.

23. A method as in claim 22 which includes training a plurality of neural networks in the expected, normal, behavior of the entity.

24. A method as in claim 23 where the entity is selected from a class which includes at least one of a movable vehicle, a body of water, or a gas filled region.

* * * * *